Figure 1:
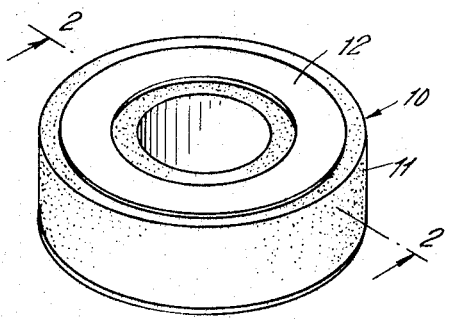

Jan. 17, 1967   E. P. EATON, JR   3,298,753
CARBON AND CARBON-GRAPHITE BEARINGS WITH ANTI-FRICTION SURFACE
Filed May 30, 1963

INVENTOR.
EDGAR P. EATON, JR.
BY Albert F. Kronman
ATTORNEY 3,298,753
CARBON AND CARBON-GRAPHITE BEARINGS
WITH ANTI-FRICTION SURFACE
Edgar P. Eaton, Jr., Morristown, N.J., assignor to The Carbone Corporation, Boonton, N.J., a corporation of New Jersey
Filed May 30, 1963, Ser. No. 277,750
5 Claims. (Cl. 308—36)

This invention relates to self lubricating bearings, seals and the like, and particularly bearings and seals employing tetrafluorethylene to reduce friction.

Tetrafluoroethylene or Teflon is well known as a low co-efficient of friction material. While this material has been employed as a self-lubricating bearing it tends to deform or extrude when subjected to heat and pressure. In addition, Teflon has poor thermal conductivity and does not dissipate frictional heat fast enough for satisfactory use in a bearing. Teflon further possesses a high co-efficient of thermal expansion causing undesirable dimensional changes in bearings which are made of this material.

Where metal bearings have been provided with a layer of Teflon on the wearing surface, failure of the Teflon as by wearing or extrusion resulted in damage to the shaft journaled within the bearing.

Although various fillers have been combined with Teflon in an effort to lend dimensional stability and improve its heat conductivity, it has been found that bearings formed of such material are still unsatisfactory, in many cases.

Accordingly, it is an object of the present invention to provide a self-lubricating bearing having all of the advantages to be obtained by the use of Teflon without its basic disadvantages.

Another object of the present invention is to provide a bearing in which the amount of Teflon employed is small as compared with the total structure.

A further object of the present invention is to provide a self-lubricating bearing which will fail safe when the Teflon layer wears away.

Another object of the present invention is to provide a bearing employing the advantages of Teflon which will be dimensionally stable.

Still another object of the present invention is to provide a bearing which will be inexpensive, light in weight and capable of prolonged use.

A feature of the present invention is the use of a thin filled Teflon tape as the wearing surface of the bearing.

Another feature of the present invention is the use of carbon or carbon-graphite as the support for the Teflon tape.

The invention consists of the construction, combination and arrangement of parts, as herein illustrated, described and claimed.

Figure 2:
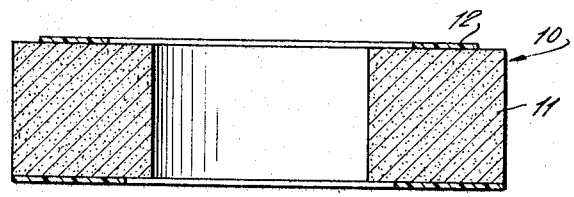
Figure 3:
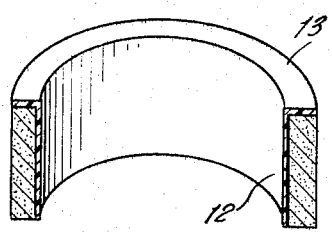

In the accompanying drawing, forming a part hereof are illustrated two forms of the present invention in which drawings, similar reference characters designate corresponding parts, and in which:

FIGURE 1 is a view in perspective of a bearing made in accordance with the present invention, FIGURE 2 is a cross-sectional view taken on line 2—2 in FIGURE 1, FIGURE 3 is a cross-sectional view of a second embodiment of the present invention.

Referring to the drawing, and particularly to FIGURES 1 and 2, 10 indicates a bearing formed of carbon or carbon-graphite 11, to which a thin tape of filled Teflon material 12 has been bonded in accordance with well known techniques so as to overlie the wearing surface or surfaces of the bearing 10.

It has been found that a relatively thin tape of the order of one-eighth inch in thickness having one or more of the conventional fillers therein which have been employed to add dimensional stability such as glass particles, metal powders, and the like provide a dimensional stability which results in less than 40% of the deformation of a thick or solid bearing of the same material. An improvement in wear resistance of more than 200% has also been found employing the thin sheet or tape of Teflon. The carbon or carbon-graphite 11, used as the backup material for the Teflon tape is itself a self-lubricating material and will continue to provide a self-lubricating bearing even though the Teflon becomes worn through. Graphite has a friction co-efficient of approximately .017 and Teflon about .004–.006. The graphite and carbon-graphite material is an excellent conductor of heat and dissipates the heat coming from the relatively thin layer of Teflon in a manner not possible with a thick Teflon bearing.

In addition, the graphite like Teflon has an almost perfect chemical resistance and the combined bearing can be used in any corrosive or chemically laden atmosphere without attack.

Teflon is a relatively expensive material. Carbon and carbon-graphite is inexpensive and easily molded and machined as desired. For these reasons carbon and carbon-graphite form an excellent backup material for the Teflon and make it possible to produce inexpensive bearings.

In FIGURE 3 there is shown a bearing of the radial and thrust type where the friction or wearing surface covered by the Teflon material 12 is on the inside diameter of the bearing and one face 13 thereof. It will be apparent that the present invention lends itself to a wide variety of bearing types as well as seals between moving parts.

Having thus fully described the invention what is claimed as new and desired to be secured by Letters Patent of the United States, is:

1. A self-lubricating bearing structure comprising an essentially carbon-graphite support of substantial thickness and a substantially continuous thin layer of tetrafluorethylene bonded to the load receiving surfaces of the support.

2. A self-lubricating bearing structure comprising an essentially carbon-graphite support of substantial thickness and a substantially continuous thin layer of filled tetrafluorethylene bonded to the load receiving surfaces of the support.

3. A self-lubricating bearing structure comprising an essentially carbon-graphite support of substantial thickness and a substantially continuous thin layer of glass particles filled tetrafluorethylene bonded to the load receiving surfaces of the support.

4. A self-lubricating bearing structure comprising an essentially carbon-graphite support of substantial thickness and a substantially continuous thin layer of tetrafluorethylene of the order of ⅛ inch bonded to the load receiving surfaces of the support.

5. A self-lubricating bearing structure comprising an essentially carbon graphite support of substantial thickness and a substantially continuous thin layer of filled tetrafluorethylene tape of the order of ⅛ inch bonded to the load receiving surfaces of the support.

(References on following page)

References Cited by the Examiner

UNITED STATES PATENTS

| | | | |
|---|---|---|---|
| 2,772,928 | 12/1956 | Schulz et al. | 308—36.1 |
| 2,774,704 | 12/1956 | Smith. | |
| 3,037,893 | 6/1962 | White. | |
| 3,056,709 | 10/1962 | Rising. | |
| 3,155,441 | 11/1964 | Bemmann. | |

FOREIGN PATENTS

| | | |
|---|---|---|
| 721,211 | 1/1955 | Great Britain. |
| 731,348 | 6/1955 | Great Britain. |
| 769,390 | 3/1955 | Great Britain. |

MARTIN P. SCHWADRON, *Primary Examiner.*

DAVID J. WILLIAMOWSKY, *Examiner.*

R. F. HESS, *Assistant Examiner.*